S. S. WILLIAMSON.
GREASE CUP.
APPLICATION FILED JULY 18, 1918.

1,432,818.

Patented Oct. 24, 1922.
2 SHEETS—SHEET 1.

INVENTOR
Samuel S. Williamson

S. S. WILLIAMSON.
GREASE CUP.
APPLICATION FILED JULY 18, 1918.
1,432,818.
Patented Oct. 24, 1922.
2 SHEETS—SHEET 2.
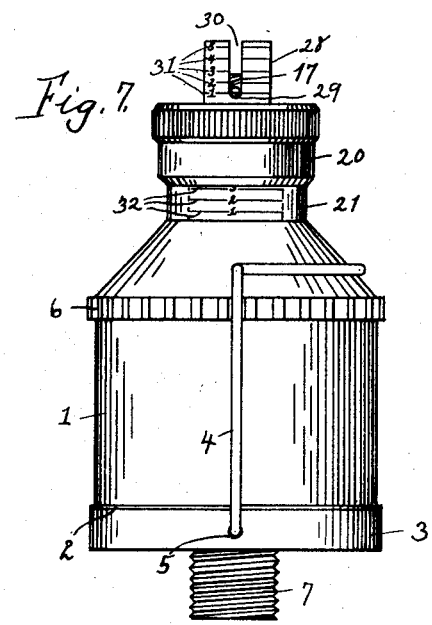
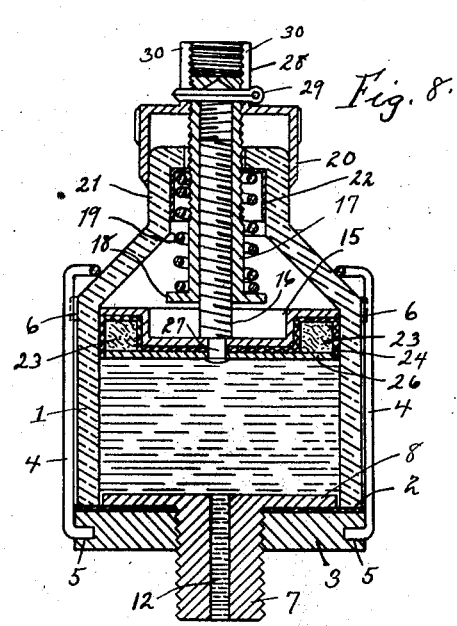
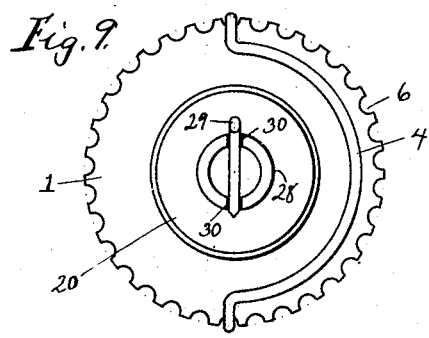
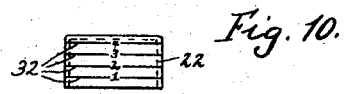
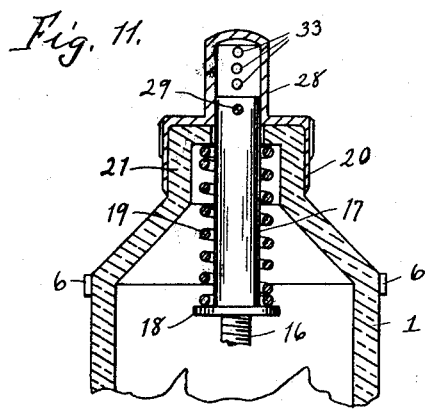
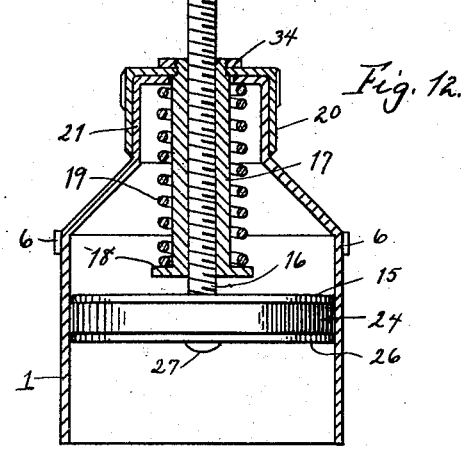
INVENTOR
Samuel S. Williamson Patented Oct. 24, 1922.

1,432,818

UNITED STATES PATENT OFFICE.

SAMUEL S. WILLIAMSON, OF PHILADELPHIA, PENNSYLVANIA.

GREASE CUP.

Application filed July 18, 1918. Serial No. 245,461.

*To all whom it may concern:*

Be it known that I, SAMUEL S. WILLIAMSON, a citizen of the United States, residing at Philadelphia, in the county of Philadelphia and State of Pennsylvania, have invented new and useful Improvements in Grease Cups, of which the following is a specification.

My invention relates to new and useful improvements in grease cups, and has for its object to provide an exceedingly simple and effective device which will provide for a graduated visual indicator to prominently show to the eye when the cup is feeding grease to the bearing and when which feeding ceases; also means for accurately regulating the feed pressure upon the grease indicating the exact amount of such pressure; also providing means for utilizing the pressure of a given length spring to force a given quantity of grease from a cup and then by readjusting the mechanism, again utilizing the same spring to force a further quantity of grease from the cup and so on until the entire contents of the cup has been fed therefrom; also to provide means for changing the pressure of the plunger upon the grease, regulating the speed with which the grease is fed from the cup; also to provide a plunger of such construction as to preclude the possibility of leakage of the grease past said plunger; also to provide means for securely locking the top member of the cup to the base thereof and also to provide means for regulating from the outside of the cup, the initial or normal tension of the spring on the inside of the cup which actuates the plunger for expelling the grease.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawing forming a part of this application, in which:

Fig. 7, is a side elevation of a grease cup of a slightly different construction from that shown in previous figures.

Fig. 8, is a central vertical section of Fig. 7, the turret being turned at right angles.

Fig. 9, is a plan view of Fig. 7.

Fig. 10, is a side elevation of the graduated thimble.

Fig. 11, is a broken away vertical section of a slightly modified form of my invention as shown in Figs. 7 and 8.

Fig. 12, is a vertical section of the top of a cup of a still further slightly modified form of my invention.

Figure 1:
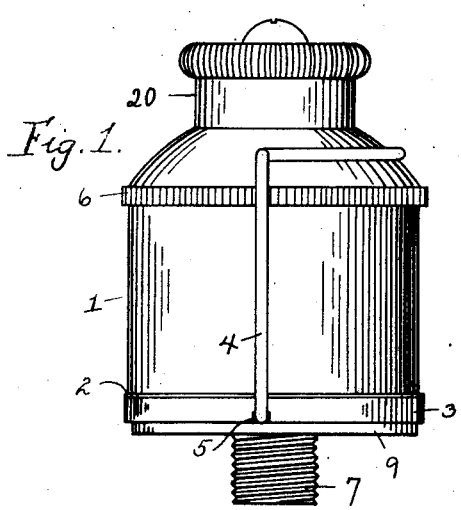
Fig. 1, is a side elevation of one form of a grease cup made in accordance with my invention.

In carrying out my invention as embodied in Figs. 1 to 6, I represents the top of the grease cup which is made of glass in order that the movements of the plunger therein may be observed, thus determining by the eye the amount of grease within the cup within a given time and when all of said grease has been expelled from the cup. This top is adapted to seat upon a compressible washer 2 superimposed upon the bottom of the cup 3, said bottom and top being adapted to be firmly clamped together by the pivoted bale 4.

The bottom 3 is here shown as made of some non-metallic material such as vulcanized fiber, porcelain or the like and has formed therein the sockets 5 for the reception of the pivoting ends of the bale.

Around the body of the top of the cup is formed a series of indentations 6 so disposed that when the bale is forced over the incline of the top of the cup and reaches the highest point thereon, each of the vertical sections of the bale will snap into one of the indentations, thus securely retaining the bale in its upright or locking position. By this arrangement no vibration or jar incident to the operation of high speed machinery will cause the unlocking of the bale, yet when it is desired to remove the top of the cup from the base thereof, this may be readily accomplished by exerting sufficient pressure in the reverse direction upon the bale to cause its vertical members to spring out of the indentations and swing from out of contact with the inclined surface, thus permitting the top to be removed from the base.

7 represents a threaded nipple by which the bottom of the cup is secured to the machine to be lubricated. This nipple passes through a suitable hole formed in the center of the bottom of the cup and carries a polygonal flange 8 for the application of a wrench to screw the nipple home, and in order that the pivoted ends of the bale may be held in their sockets and the nipple held in place in the bottom of the cup, I thread a disc 9 upon the lower portion of the nipple as clearly shown in Fig. 2.

10 represents an outlet feed regulator which is pivoted at 11 to the flange 8 and extends across the feed outlet 12 terminating in a point 13 adapted to lock into the graduated notches 14 formed in the flange so that as this regulator is moved across the outlet hole 12, it will increase the area of the outlet and therefore regulate the amount of grease which can flow therethrough in a given time under a given pressure.

Within the body of the top of the cup is fitted to slide a plunger 15, the construction of which will be hereinafter explained and this plunger has rigidly secured thereto a feed screw 16 which latter is threaded into the internally threaded stem 17 and this stem carries a flange 18 between which and the upper wall of the top of the body is interposed a spring 19. The stem passing through the top has secured thereto a signal turret 20 which surrounds the dome 21 of the top and is adapted to rise and fall thereon as next set forth.

Figure 2:
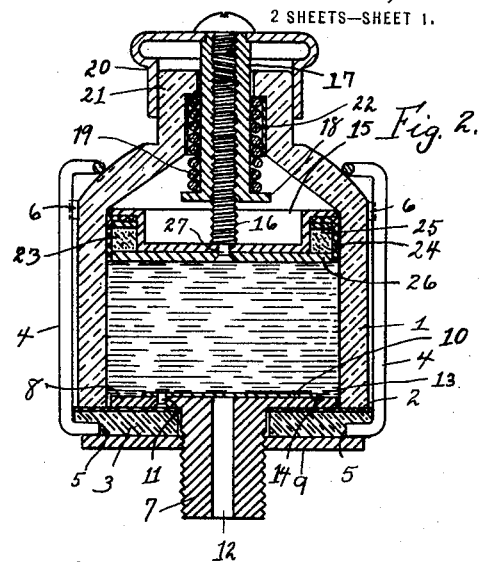
Fig. 2, is a central vertical sectional view thereof, the feed mechanism being set to put feed pressure upon the grease.
Figure 3:
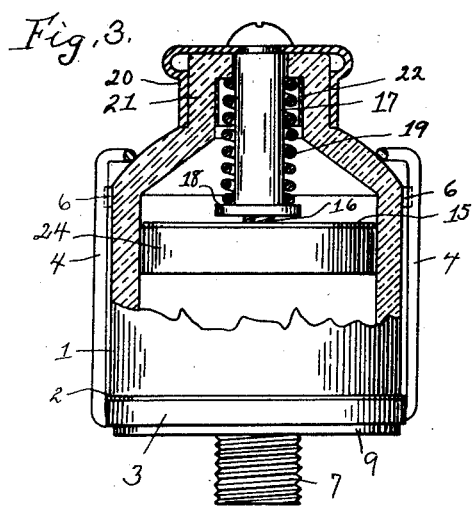
Fig. 3, is a view similar to Fig. 2 showing the feed mechanism in the position it assumes at the end of the feeding operation.
Figure 4:
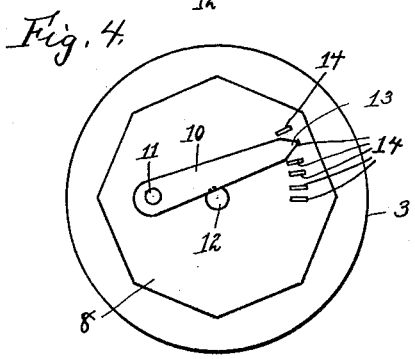
Fig. 4, is a plan view of the bottom of the cup showing the outlet regulator.
Figure 5:
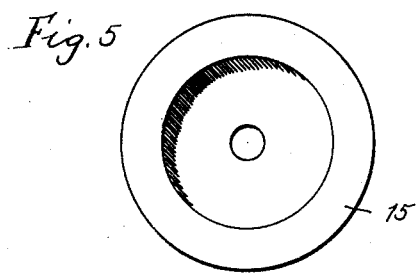
Fig. 5, is a plan view of the plunger.
Figure 6:
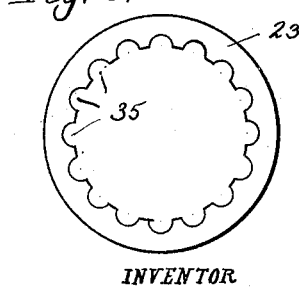
Fig. 6, is a plan view of the compressible plunger ring.

When the top of the cup is supplied with grease and the turret is revolved so as to thread the stem upward from off the plunger screw 16, the spring 19 will be compressed while at the same time the turret will be elevated as clearly shown in Fig. 2 and as the grease is fed from the cup by the force of the spring exerted upon the stem and through the screw 16 and the plunger, the turret will gradually move downward upon the dome until the lower edge of the said turret rests upon the top of the cup as clearly shown in Fig. 3, which movement represents a certain amount of grease forced from the cup. To reset the feed mechanism for forcing a further amount of grease from the cup it is only necessary to repeat the operation of revolving the turret in the proper direction to further back the stem off the screw 16 thereby recompressing the feed spring and reelevating the turret as before described. This rising and falling of the turret upon the dome clearly and readily indicates to the eye the feeding of the grease from the cup and by making the dome of a distinctive color such as blue, green or red it will serve as a prominent signal to determine when the cup is properly feeding and when it has ceased feeding. This distinctive coloring may be given to the dome by inserting a tube 22 within the dome, the outer surface of said tube being colored to the desired shade, which coloring will show through the glass as will be readily understood.

The enclosing of the dome by the turret effectually seals the cup at this point and as it is effectually sealed at the contact point between the top and bottom thereof, an absolutely dust-proof and water proof cup is produced.

As one of the essential features of an effective grease cup is a plunger which will not permit the leakage of grease or even the oil contained in the grease to leak back of the plunger, I have so constructed the plunger 15 as to preclude the possibility of such leakage even though the barrel in which it travels may have a slight taper or may have an uneven surface, which is likely to be the case in glass construction and the construction of this plunger 15 is as follows:

The plunger proper consists of a shallow cylinder, the lower end of which is closed and has an annular flange projecting therefrom which is approximately the diameter of the bore of the cup in which it is to travel and around the outer circumference of said cylinder is placed a compressible ring 23 preferably of cork or rubber and on this cylinder is also placed a leather washer or shield 24, said washer being held in place upon the plunger by a ring 25 and all being secured in place by a disc 26 which is riveted to the plunger as indicated at 27 by the lower end of the feed screw 16 which passes through said plunger and disc. The result of this construction is that when the plunger is drawn into the barrel, the leather shield will be cupped over the compressible ring compressing the latter sufficient to maintain a constant pressure of the leather against the side walls of the bore and this compression is sufficient to compensate for any taper of the bore or unevenness of its surface, while no grease or oil therefrom can be forced back of the plunger on account of this pressure fit of the plunger.

In Figs. 7, 8 and 9 I have shown a slight modification of my invention in which a micrometer feed regulator is included in the construction, thus obviating the necessity of using an outlet feed regulator upon the nipple. In this construction the turret 20 carries an extension 28 into which is threaded the upper portion of the stem 17 through which latter is formed a hole for the reception of the cotter pin 29, said extension having slots 30 therein also for the passage of said cotter pin. By this arrangement the turret may be adjusted upon the stem and by such adjustment the initial compression or tension of the spring 19 will be altered, as for instance, if the stem is set high in the extension 28, the spring 19 will be compressed to a greater degree than if said stem would be set low in said extension and when the setting of the stem has been determined it will determine the initial tension of the spring upon the plunger and in consequence, of the plunger upon the grease, thus determining the speed at which the grease will be fed from the cup.

By graduating the extension as indicated at 30 and numbering these graduations, great accuracy may be had in the varying of the grease feed, as for instance, should the external screw thread upon the stem be thirty-two threads to the inch, then one-half turn of the turret after the cotter pin has been withdrawn will change the relative position between the stem and turret one sixty-fourth of an inch when the reinsertion of the cotter pin will again secure the stem and turret together and the change in the initial pressure of the feed spring will have been but a small fraction.

If desired the colored tube 22 may be graduated as indicated at 32 and these graduations may be numbered as shown in Fig. 10 so that when this tube is inserted in the dome, these numbered graduations will show therethrough enabling the user of the cup to determine the exact amount of pressure put upon the grease for the feeding thereof, since the rising and falling of the turret will expose or cover these graduations.

In Fig. 11 I have shown a further slight modification of my invention in which the extension 28 is not slotted, but has a series of holes 33 formed therein for the insertion of the cotter pin 29 by which the relative position of the stem 17 and the turret may be changed and fixed and this form of my invention will serve for the proper regulation of the feed of the grease cup in all cases where great accuracy and delicacy of adjustment are not required.

In Fig. 12 I have shown a still further modification of my invention in which the amount of grease in the cup is determined not by observance through the glass top, but by the extension of the feed screw in such manner that it may be utilized as an indicating rod. In this construction the feed screw 16 extends through and above the stem so that when the plunger has reached the lower limit of its movement, expelling all of the grease from the cup, the upper end of this indicating rod will be flush with the upper end of the stem, thereby indicating that the feed mechanism has been set for the last time and that the cup is empty when the turret has completed its downward movement. In this case the turret is secured to the stem by a nut 34 threaded on a reduced portion of the upper end of said stem as clearly shown.

The compressible plunger ring 23 is preferably corrugated or cut away as indicated at 35 so as to increase the cushion effect or allow for a greater compressibility, and the washer or shield 24 may pass around three sides of the compressible ring and between the bottom of the plunger and the disc 26 thereby adding further security against the passage of grease or oil through or by this plunger as will be readily understood.

Of course I do not wish to be limited to the exact details of construction as herein shown, as these may be varied within the limits of the appended claims without departing from the spirit of my invention.

Having thus fully described my invention, what I claim as new and patentable is:—

1. A grease cup comprising a receptacle, a plunger within the receptacle, a feed screw fixed to the plunger, a stem having threaded engagement with the feed screw and projecting through the receptacle, a turret surrounding the upper portion of the receptacle, an extension carried by the turret with which registers the outer end of the stem and means passing through said extension and the stem whereby they may be adjusted relative to one another for regulating the initial or normal tension of the spring.

2. A grease cup comprising a receptacle, a plunger within the receptacle, a feed screw fixed to the plunger, a stem having threaded engagement with the feed screw and projecting through the receptacle, a turret surrounding the upper portion of the receptacle, an extension carried by the turret with which registers the outer end of the stem, said extension having diametrically opposite slots therein and means registering with said slots and passing through the stem for adjusting the turret relative to said stem to regulate the initial or normal tension of the spring.

3. A grease cup comprising a receptacle, a plunger within the receptacle, a feed screw fixed to the plunger, a stem having threaded engagement with the feed screw and projecting through the receptacle, a turret surrounding the upper portion of the receptacle, an extension carried by the turret with which registers the outer end of the stem and having threaded engagement with said stem whereby the turret may be adjusted relative to said stem to regulate the initial or normal tension of the spring and means for holding the parts in their adjusted positions.

4. A grease cup comprising a receptacle, a plunger within the receptacle, a feed screw fixed to the plunger, a stem having threaded engagement with the feed screw, a spring acting upon the stem to normally force the plunger outward, and means adjustably mounted on the stem, the adjustment of said means relative to the stem changing the normal initial tension of the spring, said means also acting as the medium to revolve the stem for compressing said spring for actuating the plunger.

In testimony whereof, I have hereunto affixed my signature.

SAMUEL S. WILLIAMSON.